US012723223B2

(12) United States Patent

Habara et al.

(10) Patent No.: US 12,723,223 B2
(45) Date of Patent: Sep. 1, 2026

(54) CLEANING AGENT FOR ELECTROCONDUCTIVE PASTE AND METHOD FOR CLEANING ELECTROCONDUCTIVE PASTE

(71) Applicant: Nof Corporation, Tokyo (JP)

(72) Inventors: Nanae Habara, Hyogo (JP); Hiroki Ezuka, Hyogo (JP); Hiroya Fujita, Hyogo (JP)

(73) Assignee: NOF Corporation, Tokyo (JP)

(*) Notice: Subject to any disclaimer, the term of this patent is extended or adjusted under 35 U.S.C. 154(b) by 283 days.

(21) Appl. No.: 18/681,876

(22) PCT Filed: Aug. 1, 2022

(86) PCT No.: PCT/JP2022/029421

§ 371 (c)(1),
(2) Date: Feb. 7, 2024

(87) PCT Pub. No.: WO2023/017749

PCT Pub. Date: Feb. 16, 2023

(65) Prior Publication Data

US 2024/0336881 A1 Oct. 10, 2024

(30) Foreign Application Priority Data

Aug. 10, 2021 (JP) ................................ 2021-130581

(51) Int. Cl.
*C11D 7/00* (2006.01)
*C11D 7/26* (2006.01)

(52) U.S. Cl.
CPC .......... *C11D 7/263* (2013.01); *C11D 2111/14* (2024.01)

(58) Field of Classification Search
CPC . C11D 7/263; C11D 2111/14; C11D 2111/22; C11D 3/2003; C11D 1/72
USPC ........................................................ 510/405
See application file for complete search history.

(56) References Cited

U.S. PATENT DOCUMENTS

| | | | | |
|---|---|---|---|---|
| 6,177,394 | B1 * | 1/2001 | Durbut | C11D 1/835 510/501 |
| 6,184,195 | B1 * | 2/2001 | Cheung | C11D 3/43 510/342 |
| 6,288,019 | B1 * | 9/2001 | Mertens | C11D 1/8305 510/424 |
| 6,376,448 | B1 * | 4/2002 | Colurciello, Jr. | C11D 3/162 510/435 |

FOREIGN PATENT DOCUMENTS

| | | | | |
|---|---|---|---|---|
| JP | 10-77426 | | 3/1998 | |
| JP | 2010265333 | A * | 11/2010 | C11D 1/74 |
| JP | 6598671 | B2 * | 10/2015 | C11D 1/72 |
| JP | 2017-165830 | | 9/2017 | |
| JP | 2018-021093 | | 2/2018 | |
| WO | WO 2010137635 | A1 * | 12/2010 | C11D 1/72 |

* cited by examiner

*Primary Examiner* — Eisa B Elhilo

(57) ABSTRACT

Provided is an alkaline cleaning agent that does not tend to affect screen plates, and permitting easy removal of electroconductive paste adhered to the screen plate. One embodiment relates to a cleaning agent composition for electroconductive paste, the cleaning agent composition containing a compound (component (A)) represented by formula (1) and an aliphatic alcohol (component (B)) having 2-6 (inclusive) carbon atoms and a molecular weight of 40-120 (inclusive). The pH of the cleaning agent composition is 11.0 or more and less than 14.0. Relative to the total mass of the cleaning agent composition, the content of the component (A) is 0.1-5 mass % (inclusive) and the content of the component (B) is 5-40 mass % (inclusive).

$$R^1—O—(C_2H_4O)a\text{-}H \qquad \text{Formula (1)}$$

(In formula (1), $R^1$ represents a C6-18 branched alkyl group and a, which is the average number of added mol of $C_2H_4O$ groups, is a number 2-10 (inclusive).).

2 Claims, No Drawings

CLEANING AGENT FOR ELECTROCONDUCTIVE PASTE AND METHOD FOR CLEANING ELECTROCONDUCTIVE PASTE

TECHNICAL FIELD

The present invention relates to a cleaning agent composition for a conductive paste and a method for cleaning off the conductive paste.

BACKGROUND ART

In recent years, as electronic devices have become smaller and lighter, development of thinner and finer electronic circuits and electronic substrates has been progressing. Printed electronics has been put into practical use as a technology that meets the demands for the thinner and finer circuits and substrates. Screen printing is commonly used in such a technology, and electronic circuits are formed by printing a conductive paste, which is a mixture of conductive particles and a resin, onto the surface of a substrate by using a screen plate.

Conventionally, fluorocarbon-based or chlorine-based organic solvents have been mainly used to clean devices obtained by using these conductive pastes or to clean screen plates. However, from the viewpoint of protecting the natural environment and improving work environment, there is a growing demand for VOC reduction, and semi-aqueous and aqueous cleaning agents that use organic solvents of a hydrocarbon that is non-fluorocarbon or glycol-based organic solvents are preferred in recent years.

For example, Patent Literature (hereinafter, referred to as PTL) 1 describes a cleaning agent composition for a screen printing plate, containing a glycol ether-based organic solvent and water.

For example, PTL 2 describes a cleaning agent composition for metal nano-ink, containing hydrogen peroxide, an acid, water, and a hydrocarbon-based or glycol-based organic solvent.

For example, PTL 3 describes a semi-aqueous cleaning agent composition for a screen printing plate, containing an amine, an acid, and a glycol ether-based organic solvent.

CITATION LIST

Patent Literature

PTL 1
Japanese Patent Application Laid-Open No. H10-77426
PTL 2
Japanese Patent Application Laid-Open No. 2017-165830
PTL 3
Japanese Patent Application Laid-Open No. 2018-21093

SUMMARY OF INVENTION

Technical Problem

A cleaning agent for a conductive paste removes the conductive paste from a screen plate by dissolving the paste. There is thus a concern that a conductive paste residue dissolved in a waste liquid may be redeposited onto a screen plate, causing contamination. For example, more than 70% of the cleaning agent composition of PTL 1 is a glycol ether-based organic solvent, and a conductive paste is dissolved in the cleaning agent composition to be removed.

There is thus a concern that the conductive paste residue may be redeposited onto a screen plate, causing contamination. The cleaning agent composition described in PTL 2 is characterized by dissolving and removing metal components. There is thus a concern that a conductive paste is dissolved and redeposited onto a screen plate, causing contamination. Furthermore, since the cleaning agent composition contains 5 wt % of sulfuric acid or hydrochloric acid, the cleaning agent composition may corrode a screen plate.

In addition, the waste liquid after cleaning is recycled and reused by distillation or the like, but distillation takes a long time and sometimes requires a large amount of energy.

Therefore, there is a demand for a semi-aqueous or aqueous cleaning agent that can remove a paste residue in a waste liquid by filtration in a short time and in a simple manner by peeling off the conductive paste to precipitate the paste. On the other hand, cleaning agents are required to have high cleaning power in order to be used for increasingly finer circuit wiring. In this regard, the cleaning agent composition described in PTL 3 has a high cleaning effect on flux. However, the cleaning power of this cleaning agent composition may be insufficient for a conductive paste containing metal components whose particle size is smaller than that of flux.

As described above, there has been no cleaning agent that can both satisfactorily remove the precipitate and have satisfactory cleaning power.

The present invention has been made in view of the above circumstances. An object of the present invention is to provide an alkaline cleaning agent that is less likely to affect a screen plate, and peels off a conductive paste attached to the screen plate to precipitate the paste, thereby removing the paste by filtration in a simpler manner.

Solution to Problem

A cleaning agent for a conductive paste in one aspect of the present invention for solving the above problems is a cleaning agent composition for a conductive paste. the composition contains a compound (component (A)) represented by formula (1); and an aliphatic alcohol (component (B)) having 2 or more and 6 or less carbon atoms and a molecular weight of 40 or more and 120 or less. The pH of the cleaning agent composition is 11.0 or more and less than 14.0, and based on the total mass of the cleaning agent composition, the content of the component (A) is 0.1 mass % or more and 5 mass % or less, and the content of the component (B) is 5 mass % or more and 40 mass % or less.

$$R^1—O—(C_2H_4O)a\text{-}H \qquad \text{formula (1)}$$

In formula (1), $R^1$ represents a branched alkyl group having 6 or more and 18 or less carbon atoms, and a representing an average addition mole number of $C_2H_4O$ group (average number of moles of $C_2H_4O$ group added) is a number of 2 or more and 10 or less.

A method for cleaning off a conductive paste in one aspect of the present invention for solving the above problems includes preparing a screen plate with the conductive paste attached to a surface thereof, and bringing the cleaning agent composition according to claim 1 into contact with the surface of the screen plate, the surface being a surface to which the conductive paste is attached.

Advantageous Effects of Invention

A cleaning agent for a conductive paste of the present invention is a cleaning agent that has satisfactory cleaning power for removing a conductive paste and can remove the conductive paste attached to a screen plate by filtration in a simple manner by peeling off and precipitating the paste.

DESCRIPTION OF EMBODIMENTS

Hereinafter, at least one embodiment of the present invention will be described.

A cleaning agent composition for a conductive paste (hereinafter also simply referred to as "cleaning agent") relating to one embodiment of the present invention contains a compound (component (A)) represented by formula (1), and an aliphatic alcohol (component (B)) having 2 or more and 6 or less carbon atoms and a molecular weight of 40 or more and 120 or less. The pH of the cleaning agent is 11.0 or more and less than 14.0, and based on the total mass of the cleaning agent, the content of the component (A) is 0.1 mass % or more and 5 mass % or less, and the content of the component (B) is 5 mass % or more and 40 mass % or less.

$$R^1—O—(C_2H_4O)a\text{-}H \qquad \text{formula (1)}$$

In formula (1), $R^1$ represents a branched alkyl group having 6 or more and 18 or less carbon atoms, and a representing an average addition mole number of $C_2H_4O$ group is a number of 2 or more and 10 or less.

Each component contained in the cleaning agent will be described below.

Component (A)

The component (A) is a compound (polyalkylene glycol) represented by formula (1). The cleaning agent may contain only one type of component (A) or may contain one or more types of component (A).

$$R^1—O—(C_2H_4O)a\text{-}H \qquad \text{formula (1)}$$

In formula (1), $R^1$ represents a branched alkyl group having 6 or more and 18 or less carbon atoms. $R^1$ is preferably a branched alkyl group having 8 or more and 10 or less carbon atoms. When $R^1$ is a branched alkyl group having 8 or more and 10 or less carbon atoms, the paste can be easily peeled off because of the increased permeability.

In particular, as the component (A) having $R^1$ being a branched alkyl group, a conductive paste can be removed without solubilizing the conductive paste. From the viewpoint of transmittancy and recovery rate, the branched chain in $R^1$ is preferably an alkyl group having 1 or more and 3 or less carbon atoms, and more preferably a methyl branch or an ethyl branch.

Specific examples of $R^1$ include isooctyl group, 2-ethylhexyl group, isononyl group, 3,5,5-trimethylhexyl group, and isodecyl group. $R^1$ may be of only one type or may be of one or more types.

In formula (1), a is the average addition mole number of the oxyethylene group ($C_2H_4O$) and is a number of 2 or more and 10 or less. It is preferred that a is a number of 4 or more and 8 or less.

The hydrophilic-lipophilic balance (HLB) value of the component (A) is preferably 10 or more and 15 or less. When the HLB value of the component (A) is 10 or more, the oil solubility of the component (A) does not become too large, allowing the cleaning agent to be less likely to separate into layers. When the HLB value of the component (A) is 15 or less, the hydrophilicity of the component (A) does not become too large, allowing the cleaning agent to be less likely to solubilize a paste residue.

The content of the component (A) based on the total mass of the cleaning agent is 0.1 mass % or more and 5 mass % or less, preferably 0.5 mass % or more and 4 mass % or less, and more preferably 1 mass % or more and 3 mass % or less. When the content of the component (A) is 0.1 mass % or more, the permeability of the cleaning agent is increased and the paste can be peeled off and precipitated. When the content of the component (A) is 5% or less, the conductive paste is less likely to be solubilized; thus, re-deposition and contamination on the screen plate are less likely to occur.

Component (B)

The component (B) is an aliphatic alcohol having 2 or more and 6 or less carbon atoms and a molecular weight of 40 or more and 120 or less. The component (B) can improve the ability to clean off a conductive paste. The effects of the present invention can be obtained by using an aliphatic alcohol having a carbon atom number and a molecular weight within the above ranges. An aliphatic alcohol having a molecular weight of 120 or less can improve transmittancy and recovery, thereby shortening filtration time. The cleaning agent may contain only one type of component (B) or may contain one or more types of component (B).

The component (B) preferably has a Fedors SP value of 10 $(cal/cm^3)^{1/2}$ or more and 14 $(cal/cm^3)^{1/2}$ or less. When the SP value of the component (B) is 10 $(cal/cm^3)^{1/2}$ or more, the cleaning agent is less likely to solubilize a conductive paste. When the SP value of the component (B) is 14 $(cal/cm^3)^{1/2}$ or less, the compatibility between the cleaning agent and the paste increases, and the cleaning power is more likely to improve.

The component (B) is preferably a water-soluble alcohol. In addition, the component (B) may have an alicyclic structure or may have a non-alicyclic (linear or branched) structure. Furthermore, the component (B) may have an ether structure in the molecule. The component (B) has one or more and two or less hydroxyl groups in the molecule.

Examples of the component (B) include ethanol, isopropyl alcohol, 1,2-pentanediol, 2,4-pentanediol, ethylene glycol monomethyl ether, ethylene glycol monoethyl ether, ethylene glycol monobutyl ether, 3-methoxy-1-butanol, 3-methoxy-3-methyl-1-butanol, and tetrahydrofurfuryl alcohol.

In particular, 3-methoxy-3-methyl-1-butanol, ethanol, isopropyl alcohol, and tetrahydrofurfuryl alcohol are preferred, and 3-methoxy-3-methyl-1-butanol is more preferred.

The content of the component (B) based on the total mass of the cleaning agent is 5 mass % or more and 40 mass % or less, preferably 10 mass % or more and 35 mass % or less, and more preferably 15 mass % or more and 30 mass % or less. When the content of the component (B) is 5 mass % or more, the permeability of the cleaning agent is increased, thereby peeling off the paste, and shortening filtration time. When the content of the component (B) is 40 mass % or less, transmittancy and recovery are satisfactorily increased, thereby shortening filtration time. In addition, the cleaning agent is less likely to separate into layers thus has satisfactory storage stability.

The pH and Alkaline Component (Component (C))

The pH of the cleaning agent is 11.0 or more and 14.0 or less, preferably 11.5 or more and 13.9 or less. When the pH is within the above range, the cleaning performance is satisfactorily increased. The pH of the cleaning agent can be adjusted within the above range by adding a known alkaline component (component (C)). The cleaning agent may contain only one type of component (C) or may contain one or more types of component (C) for adjusting the pH.

The component (C) is a water soluble compound and when dissolved in water, changes the resultant aqueous solution to alkaline. The component (C) may be an organic alkaline component or an inorganic alkaline component.

Examples of the organic alkaline component in the component (C) include monoethanolamine, diethanolamine, triethanolamine, and pyridine. Examples of the inorganic alkaline component in the component (C) include sodium hydroxide, potassium hydroxide, lithium hydroxide, calcium hydroxide, sodium carbonate, potassium carbonate, sodium silicate, and potassium silicate.

The component (C) is preferably monoethanolamine, diethanolamine, sodium hydroxide, potassium hydroxide, sodium carbonate, or potassium carbonate, more preferably sodium hydroxide or potassium hydroxide, from the viewpoint of further increasing cleaning performance. The component (C) hydrolyzes the resin contained in a conductive paste, thereby peeling the paste from a screen plate.

Acid Component (Component (D))

The cleaning agent may contain an acid component (component D) for adjusting pH. The cleaning agent may contain only one type of component (D) or may contain one or more types of component (D). The component (D) may be a further component for finely adjusting the pH in addition to the component (C). As the component (D), for example, an organic acid component can be used. Examples of the organic acid component include propionic acid, butyric acid, valeric acid, 2-methylbutyric acid, n-hexanoic acid, 2-ethylbutyric acid, 4-methylpentanoic acid, n-heptanoic acid, n-octanoic acid, and 2-ethylhexanoic acid, benzoic acid, oxalic acid, malonic acid, succinic acid, glutaric acid, maleic acid, phthalic acid, malic acid, tartaric acid, citric acid, and lactic acid. In particular, citric acid and 2-ethylhexanoic acid are preferred.

Additional Component

In addition to the components described above, the cleaning agent may contain additional components generally added in conventional cleaning agents for conductive pastes. Examples of the above additional component include preservatives, thickeners, and colorants.

Preparation of Cleaning Agent

A cleaning agent may be prepared by a known method in which the above components are diluted with water until having appropriate concentrations to obtain an aqueous solution. As the water used for dilution, ion-exchanged water, distilled water, RO water, tap water, industrial water, or the like may be used.

The content of the water based on the total mass of the cleaning agent is preferably 50 mass % or more, more preferably 60 mass % or more, and even more preferably 65 mass % or more. The content of the water is not limited, but preferably 90 mass % or less.

Use of Cleaning Agent

The cleaning agent is used to remove a conductive paste temporarily attached to the surface of a screen plate.

It is considered that the cleaning agent permeates the paste at the interface between the screen plate and the paste, reduces the adhesion at the interface between the screen plate and the paste, thereby peeling off the paste. In order to achieving these functions more fully, it is preferred to allow the cleaning agent to satisfactorily permeate the paste so that a satisfactory amount of the cleaning agent reaches the interface between the screen plate and the conductive paste. Furthermore, it is considered that the cleaning agent peels off the paste due to the above-described permeation, causing precipitation more easily.

The temperature of the cleaning agent when it is brought into contact with the conductive paste is preferably about 30 to 70° C.

A conductive paste is a general term for materials in which conductive particles are dispersed in a synthetic resin. Examples of the synthetic resin include thermoplastic resins such as acrylic resins and polyesters, and thermosetting resins such as phenolic resins and epoxy resins. Examples of the conductive particles include carbon black, metal particles (for example, silver, copper, and nickel), and tin oxide, with a size of submicron to 100 microns.

EXAMPLES

Hereinafter, the present invention will be described with reference to Examples and Comparative Examples; however, the present invention is not limited to the following Examples.

1. Preparation of Cleaning Agents 1-1. Materials 1-1-1. Component (A)

Compounds A1, A2 and A1' shown in Table 1 were prepared. The compounds A1 and A2 are each a compound (component (A)) represented by formula (1). The compound A1' has a structure represented by formula (1) but is not component (A) because $R^1$ is different.

$$R^1\text{—O—}(C_2H_4O)a\text{-H} \quad \text{formula (1)}$$

For the compounds A1, A2, and A1', Table 1 shows the structure of $R^1$ in formula (1) (functional group name), the number of carbon atoms in $R^1$, number of a of the oxyethylene group ($C_2H_4O$), and the HLB value.

TABLE 1

| Compound | $R^1$ Functional group name | $R^1$ Carbon atom number | $R^1$ Structure | a | HLB value |
|---|---|---|---|---|---|
| A1 | 2-Ethylhexyl group | 8 | Branched | 4 | 12 |
| A2 | Isodecyl group | 10 | Branched | 6 | 13 |
| A1' | Lauryl group | 12 | Linear | 4 | 10 |

1-1-2. Component (B)

Compounds B1 to B4 and B1' shown in Table 2 were prepared. The compounds B1 to B4 are aliphatic alcohols (component (B)) each having 2 or more and 6 or less carbon atoms and a molecular weight of 40 or more and 120 or less, and the compound B1' is an organic solvent that is not a component (B).

For the compounds B1 to B4 and B1', Table 2 shows the compound name, the molecular weight, the number of carbon atoms, the number of hydroxyl groups, and the SP value.

TABLE 2

| Compound | Compound name | Molecular weight | Carbon atom number | Hydroxyl group number | SP value |
|---|---|---|---|---|---|
| B1 | 3-Methoxy-3-methyl-1-butanol | 118 | 6 | 1 | 10 |
| B2 | Ethanol | 46 | 2 | 1 | 13 |
| B3 | Isopropyl alcohol | 60 | 3 | 2 | 12 |
| B4 | Tetrahydrofurfuryl alcohol | 102 | 5 | 1 | 13 |
| B1' | Diethylene glycol dimethyl ether | 134 | 6 | 0 | 8 |

1-1-3. Component (C)

Compounds C1 to C3 shown in Table 3 were prepared. The compounds C1 to C3 are all component (C).

Table 3 shows the compound names of the compounds C1 to C3.

TABLE 3

| Compound | Compound name |
|---|---|
| C1 | Sodium hydroxide |
| C2 | Potassium hydroxide |
| C3 | Monoethanolamine |

1-1-4. Component (D)

Compounds D1 and D2 shown in Table 4 were prepared. The compounds D1 and D2 are both component (D).

Table 4 shows the compound names of the compounds D1 and D2.

TABLE 4

| Compound | Compound name |
|---|---|
| D1 | Citric acid |
| D2 | 2-Ethylhexanoic acid |

1-2. Preparation of Cleaning Agents

The cleaning agent compositions of Examples 1 to 9 and Comparative Examples 1 to 6 were each prepared by dissolving the above components in water and further adding water so that the total amount becomes 100 mass %.

2. Measurement of pH

The pH of the cleaning agent compositions of Examples 1 to 9 and Comparative Examples 1 to 6 was measured by using a pH meter ("LAQUA F-72," manufactured by Horiba, Ltd.). The measurement temperature was set at 25° C., and the pH was measured while each cleaning agent was stirred in a constant temperature bath at 25° C.

3. Evaluation of Cleaning Agents

The cleaning agent compositions of Examples 1 to 9 and Comparative Examples 1 to 6 prepared above were evaluated based on the following criteria.

3-1. Cleaning Test 3-1-1. Preparation of Cleaned Test Pieces (Cleaning Evaluation and Transmittance Evaluation)

A 30 mm×15 mm metal mesh (100 mesh) was weighed and recorded in advance. Conductive paste ("DY-150H-30" with thermosetting resin as resin and carbon black as conductive particles, manufactured by Toyobo Co., Ltd.) was applied to the lower half (10 mm) of the mesh, and the excess paste was removed to prepare a test piece. The paste applied test piece was reweighed and the amount of paste applied was recorded.

3-1-2. Cleaning Test

Added to a 20 mL screw tube was 10 g of the above-prepared cleaning agent, and the temperature was kept at 60° C. The test piece prepared as above was completely immersed and heated to 60° C. while being irradiated with 125 W of ultrasonic waves for 10 minutes by using an ultrasonic cleaner ("BRANSON B-220," manufactured by Emerson Electric Co.). Thereafter, the test piece was rinsed with ion-exchanged water, thoroughly dried, and the weight of the test piece was measured. The cleaning rate was calculated from the change in weight of the test piece before and after cleaning. The method for calculating the cleaning rate is as follows. This test was conducted twice, and the average value was taken as the measurement result of the test.

$$\text{Cleaning rate (\%)} = \frac{\text{Applied paste weight (g)} - \text{Paste weight after cleaning (g)}}{\text{Applied paste weight (g)}} \times 100$$

Each cleaning liquid was evaluated according to the following criteria based on the cleaning rate measured above.

(1) Cleaning Evaluation

Excellent: Cleaning rate is 90% or more

Good: Cleaning rate is 80% or more and less than 90%

Poor: Cleaning rate is less than 80%

3-2. Transmittance Measurement

The cleaning liquid obtained in the above cleaning test was filtered through a filter cloth (2 μm, made of nylon). At this time, co-washing was performed with 1 g of ion-exchanged water. The transmittance of the filtrate was measured by using a spectrophotometer ("U-3010," manufactured by Hitachi, Ltd.). The transmittance was calculated as a percentage by reading the value at a wavelength of 660 nm and comparing the value with the transmittance of ion-exchanged water. This test was conducted twice, and the average value was taken as the measurement result of the test.

Each cleaning liquid was evaluated according to the following criteria based on the transmittance measured above.

(2) Transmittancy Evaluation

Excellent: Transmittance is 80% or more

Good: Transmittance is 70% or more and less than 80%

Poor: Transmittance is less than 70%

3-3. Filtration Test

Filter paper for Kiriyama Rohto (funnel) (No. 5B with retained particle size of 4 μm, manufactured by Kiriyama Glass Works Co.) whose weight had been measured in advance was placed in the Kiriyama Rohto. A cleaning test was conducted in the same manner as described above, and the obtained cleaning liquid was filtered through the prepared Kiriyama Rohto. The filter paper after filtration was dried in an oven at 70° C. for 1 hour. The weight of the dried filter paper was measured, and the recovery rate of the paste was calculated from the weight change before and after filtration. The method for calculating the recovery rate is as follows.

$$\text{Recovery rate (\%)} = \frac{\text{Filter paper weight after filtration (g)} - \text{Filter paper tare weight (g)}}{\text{Weight of paste contained in waste liquid (g)}} \times 100$$

Each cleaning liquid was evaluated according to the following criteria based on the recovery rate measured above.

(3) Filtration Recovery Evaluation

Good: Recovery rate is 80% or more

Poor: Recovery rate is less than 80%

3-4. Filtration Time Measurement Test

A funnel with a membrane filter was prepared by holding the membrane filter ("ADVANTEC MEMBRANE FILTER" with pore diameter of 0.1 μm, made of PTFE, manufactured by ADVANTEC) between a glass filter base and a funnel. A cleaning test was conducted in the same manner as described above, and the obtained cleaning liquid was placed in the prepared funnel and distilled off under reduced pressure (approximately −0.1 MPa) by using an aspirator. The time from when the cleaning liquid was poured into the funnel until when the entire amount of the cleaning liquid was filtered was measured.

Each cleaning liquid was evaluated according to the following criteria based on the filtration time measured above.

(4) Filtration Time Evaluation

Good: Filtration time is less than 100 seconds

Poor: Filtration time is 100 seconds or more

For the cleaning agent compositions of Examples 1 to 9 and Comparative Examples 1 to 6, Tables 5 and 6 show the content of each component contained in each cleaning agent composition, the pH of each cleaning liquid, and the evaluation results for each cleaning liquid. The numerical value for each component in Tables 5 and 6 indicates the ratio (unit:mass %) of the component based on the total mass of the cleaning agent.

As shown in Tables 5 and 6, a cleaning agent containing the component (A), component (B), and component (C) or containing the component (A), component (B), component (C), and component (D) has satisfactory cleaning power for removing a conductive paste and can remove the conductive paste attached to a screen plate by filtration in a simple manner by peeling off and precipitating the paste.

This application is entitled to and claims the benefit of Japanese Patent Application No. 2021-130581 filed on Aug. 10, 2021, the disclosure of which including the claims and specification is incorporated herein by reference in its entirety.

INDUSTRIAL APPLICABILITY

The present invention can provide cleaning agent compositions to be used for a conductive paste attached to a

TABLE 5

| Remark | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Cleaning Agent | Component (A) | A1 | 1 | 1 | 2 | | 1 | 2 | 1 | 1 | 1 |
| | | A2 | | | | 2 | | 1 | | 1 | |
| | Component (B) | B1 | 15 | 20 | 20 | 15 | | | | 20 | |
| | | B2 | | | | | 15 | | | | 15 |
| | | B3 | | | | 5 | | 20 | | | |
| | | B4 | | | | | | | 30 | | |
| | Component (C) | C1 | 2 | | | | 1 | | | | 2 |
| | | C2 | | 3 | | 3 | 2 | 2 | 2 | 3 | |
| | | C3 | | | 3 | | | | | | |
| | Component (D) | D1 | | | | | | | | 3 | |
| | | D2 | | | | | | | | | 3 |
| | Water | | Balance | Balance | Balance | Balance | Balance | Balance | Balance | Balance | Balance |
| | pH | | 13.3 | 13.8 | 11.5 | 13.8 | 13.8 | 13.6 | 13.8 | 13.6 | 12.7 |
| Evaluation result | (1) Cleaning rate | Evaluation | Good | Excellent | Good | Excellent | Excellent | Good | Good | Good | Good |
| | | (%) | 82 | 92 | 85 | 91 | 90 | 86 | 80 | 89 | 87 |
| | (2) Transmittance | Evaluation | Excellent | Excellent | Excellent | Excellent | Good | Good | Good | Excellent | Good |
| | | (% T) | 94 | 89 | 92 | 87 | 75 | 78 | 77 | 85 | 73 |
| | (3) Recovery rate | Evaluation | Good | Good | Good | Good | Good | Good | Good | Good | Good |
| | | (%) | 99 | 99 | 99 | 97 | 86 | 90 | 87 | 97 | 85 |
| | (4) Filtration time | Evaluation | Good | Good | Good | Good | Good | Good | Good | Good | Good |
| | | (sec) | 87 | 98 | 86 | 95 | 72 | 79 | 92 | 98 | 75 |

TABLE 6

| Remark | | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Cleaning Agent | Component (A) | A1 | 1 | | | 1 | 1 | 1 |
| | | A1' | | 1 | | | | |
| | Component (B) | B1 | 20 | 25 | 40 | | | 60 |
| | | B1' | | | | 20 | | |
| | Component (C) | C2 | | 3 | 3 | 3 | 3 | 2 |
| | Water | | Balance | Balance | Balance | Balance | Balance | Balance |
| | pH | | 6.4 | 13.8 | 13.8 | 13.8 | 13.8 | 13.6 |
| Evaluation result | (1) Cleaning rate | Evaluation | Poor | Good | Poor | Excellent | Poor | Excellent |
| | | (%) | 41 | 87 | 73 | 99 | 63 | 99 |
| | (2) Transmittance | Evaluation | Excellent | Poor | Good | Poor | Excellent | Poor |
| | | (% T) | 99 | 65 | 72 | 2 | 82 | 3 |
| | (3) Recovery rate | Evaluation | Good | Poor | Good | Poor | Good | Poor |
| | | (%) | 99 | 76 | 83 | 71 | 94 | 68 |
| | (4) Filtration time | Evaluation | Good | Good | Good | Poor | Poor | Poor |
| | | (sec) | 78 | 90 | 98 | 307 | >600 | 451 |

screen plate, which can simplify waste liquid treatment after the cleaning, thereby contributing to energy reduction and time saving for recycling.

The invention claimed is:

1. A cleaning agent composition for a conductive paste, the composition comprising:

a component (A) represented by formula (1):

$$R^1—O—(C_2H_4O)a\text{-}H \quad \text{formula (1)}$$

wherein, $R^1$ represents a 2-ethylhexyl group or an isodecyl group, and a representing an average addition mole number of $C_2H_4O$ group is a number of 2 or more and 10 or less; and 3-methoxy-3-methyl-1-butanol (component (B)), wherein pH of the cleaning agent composition is 11.0 or more and less than 14.0, and a content of the component (A) based on a total mass of the cleaning agent composition is 0.1 mass % or more and 5 mass % or less, and a content of the component (B) based on the total mass of the cleaning agent composition is 5 mass % or more and 40 mass % or less.

2. A method for cleaning off a conductive paste, the method comprising:

preparing a screen plate with the conductive paste attached to a surface of the screen plate; and bringing the cleaning agent composition according to claim 1 into contact with the surface of the screen plate, the surface being a surface to which the conductive paste is attached.

* * * * *